US011532939B1

(12) United States Patent
Roberts et al.

(10) Patent No.: US 11,532,939 B1
(45) Date of Patent: Dec. 20, 2022

(54) SOLAR ENERGY MANAGEMENT

(71) Applicant: Alarm.com Incorporated, Tysons, VA (US)

(72) Inventors: Aaron Lee Roberts, Centreville, VA (US); Bret Jutras, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 367 days.

(21) Appl. No.: 15/865,882

(22) Filed: Jan. 9, 2018

Related U.S. Application Data

(60) Provisional application No. 62/444,185, filed on Jan. 9, 2017.

(51) Int. Cl.
*H02J 3/38* (2006.01)
*G06F 3/041* (2006.01)
*H02J 7/35* (2006.01)
*H04L 12/28* (2006.01)

(52) U.S. Cl.
CPC ............ *H02J 3/383* (2013.01); *G06F 3/0412* (2013.01); *G06F 3/0416* (2013.01); *H02J 7/35* (2013.01); *H04L 12/2816* (2013.01)

(58) Field of Classification Search
CPC .. H02J 3/383; H02J 3/466; H02J 3/472; H02J 2300/22; H02J 2300/24; H02J 7/35
USPC ......................................................... 320/101
See application file for complete search history.

(56) References Cited

U.S. PATENT DOCUMENTS

| 2008/0290838 | A1* | 11/2008 | Llonch | H02J 7/35 320/137 |
| 2009/0027932 | A1* | 1/2009 | Haines | H02J 9/062 363/95 |
| 2010/0312430 | A1* | 12/2010 | Troncoso | H02J 1/10 701/31.4 |
| 2011/0068624 | A1* | 3/2011 | Dibachi | H02J 7/00 307/18 |
| 2011/0291479 | A1* | 12/2011 | Lee | H02J 3/32 307/43 |
| 2012/0235493 | A1* | 9/2012 | Kiuchi | H01M 10/44 307/66 |
| 2012/0277923 | A1* | 11/2012 | Tsuchiya | B60L 53/51 700/291 |
| 2018/0117613 | A1* | 5/2018 | Zito, Jr. | B05B 12/02 |

\* cited by examiner

*Primary Examiner* — David V Henze-Gongola
(74) *Attorney, Agent, or Firm* — Fish & Richardson P.C.

(57) ABSTRACT

Systems and techniques for solar energy management are described. A described system includes circuitry to determine a solar power generation value based on a power output of a solar power generator configured to supply electricity to a plurality of devices associated with a property; circuitry to determine a power consumption value of the plurality of devices; and a controller configured to determine a power status based on the solar power generation value and the power consumption value. The controller can be configured to selectively enable additional power consumption among the plurality of devices to an extent of the solar power generation value based on the power status indicating a power surplus state. The controller can be configured to selectively reduce power consumption among the plurality of devices based on the power status indicating a power deficit state.

27 Claims, 8 Drawing Sheets

SOLAR ENERGY MANAGEMENT

CROSS REFERENCE TO RELATED APPLICATION

This disclosure claims the benefit of the priority of U.S. Provisional Application Ser. No. 62/444,185, entitled "Solar Energy Management" and filed Jan. 9, 2017, which is incorporated herein by reference in its entirety.

TECHNICAL FIELD

This disclosure relates to solar energy management technology.

BACKGROUND

Solar power provides clean energy to various homes and offices. A dwelling can be powered through conventional power lines and solar power. A solar power system can include one or more solar panels, one or more batteries, and a controller. A dwelling can include circuitry to selectively draw power from either conventional power lines or the solar power system based on current supply and demand. In some cases, if solar power is not providing enough power, then the dwelling can draw power from the power lines. In some implementations, a solar power system can use one or more batteries to store excess energy from generated by the solar panels for use later. Thus, before drawing power from the power lines, the system would draw power from the batteries should solar power generation cease or fall below a threshold.

SUMMARY

The present disclosure includes techniques and systems for solar energy management including energy usage scaling based on, for example, solar power generation, customer energy usage prioritization, residence status, or a combination thereof. According to an aspect of the present disclosure, a described technique includes determining whether power consumption is less than solar power generation and enabling additional power consumption to the extent of current solar power generation. The technique can include determining whether a solar system's battery reverse is charging.

According to another aspect of the present disclosure, a described technique includes determining whether solar power generation is less than power consumption and, if less, controlling one or more devices that have a low energy utilization priority to use less energy and maintaining the energy utilization of one or more devices that have a high energy utilization priority.

According to yet another aspect of the present disclosure, a described technique includes determining whether a new scene has been selected or triggered, retrieving a scene configuration record for the new scene, retrieving devices associated with a property, selectively and changing each of the devices' energy utilization priority based on the scene configuration record. The technique can include determining a power status, e.g., a solar surplus or deficit, and controlling the devices based on their respective energy utilization priorities and the power status.

According to another aspect of the present disclosure, a described system includes circuitry to determine a solar power generation value based on a power output of a solar power generator configured to supply electricity to a plurality of devices associated with a property; circuitry to determine a power consumption value of the plurality of devices; and a controller configured to determine a power status based on the solar power generation value and the power consumption value. The controller can be configured to selectively enable additional power consumption among the plurality of devices to an extent of the solar power generation value based on the power status indicating a power surplus state. The controller can be configured to selectively reduce power consumption among the plurality of devices based on the power status indicating a power deficit state.

These and other implementations can include one or more of the following features. In some implementations, the controller is configured to operate the plurality of devices in accordance with first energy utilization priority indicators associated with a first scene, the first energy utilization priority indicators indicating respective power consumption states of the plurality of devices. The controller can be configured to detect whether a second scene is triggered, retrieve a scene configuration record for the second scene, the scene configuration record including second energy utilization priority indicators, and operate the plurality of devices in accordance with the second energy utilization priority indicators and the power status. In some implementations, the second scene is configured to cause one or more selected devices of the plurality of devices to switch from a low energy utilization mode to a high energy utilization mode. The controller can be configured to operate the one or more selected devices in the high energy utilization mode based on the power status indicating the power deficit state. In some implementations, the second scene is triggered by a user selection of the second scene via a control interface, time of day trigger, or a sensor input.

In some implementations, the controller is configured to access energy utilization priority indicators of the plurality of devices, identify one or more first devices of the plurality of devices that have a first energy utilization priority based on the energy utilization priority indicators, identify one or more second devices of the plurality of devices that have a second energy utilization priority based on the energy utilization priority indicators, the second energy utilization priority being higher than the first energy utilization priority, reduce power consumption of the one or more first devices based on the power status indicating the power deficit state, and maintain power consumption of the one or more second devices based on the power status indicating the power deficit state.

In some implementations, the power status is a predicted power status. In some implementations, the solar power generation value is based on a predicted solar power output. In some implementations, the predicted power status is based on a predicted solar power output. In some implementations, the power status is based on a user preference record regarding energy management criteria. Implementations can include circuitry to determine a battery charging status associated with a battery. The controller can be configured to delay an enabling of the additional power consumption based on the battery charging status indicating that the battery is charging.

According to another aspect of the present disclosure, a described system includes circuitry to determine a solar power generation value of a solar power generator configured to supply electricity to a plurality of devices associated with a property; circuitry to determine a power consumption value of the plurality of devices; and a controller. The controller can be configured to determine whether the property is experiencing a power deficit based on the solar power generation value being less than the power consumption value, access energy utilization priority indicators of the plurality of devices, identify one or more first devices of the plurality of devices that have a lower energy utilization priority than one or more second devices of the plurality of devices based on the energy utilization priority indicators, and reduce power consumption of the one or more first devices based on the property experiencing the power deficit.

These and other implementations can include one or more of the following features. In some implementations, the energy utilization priority indicators are first energy utilization priority indicators associated with a first scene. In some implementations, the controller is configured to detect whether a second scene is triggered, retrieve a scene configuration record for the second scene, the scene configuration record including second energy utilization priority indicators, determine a power status based on a power output of the solar power generator and a power consumption of the plurality of devices, and operate the plurality of devices in accordance with the second energy utilization priority indicators and the power status. In some implementations, the second scene is configured to cause one or more selected devices of the plurality of devices to switch from a low energy utilization mode to a high energy utilization mode. In some implementations, the controller is configured to operate the one or more selected devices in the high energy utilization mode based on the power status indicating a power deficit state.

In some implementations, the controller is configured to determine whether the property is experiencing a power surplus based on the solar power generator generating more power than a current power consumption of the plurality of devices. In some implementations, the controller is configured to enable additional power consumption among the one or more first devices, the one or more second devices, or both based on the property experiencing the power surplus. In some implementations, the one or more first devices include a lighting device. The controller can be configured to send a command to the lighting device to cause the lighting device to dim light output by a predetermined amount. Implementations can include circuitry to determine a battery charging status associated with a battery, the battery being coupled with the solar power generator. The controller can be configured to use the battery charging status to determine whether the property is experiencing the power deficit.

According to another aspect of the present disclosure, a described technique includes determining a solar power generation value of a solar power generator configured to supply electricity to a plurality of devices associated with a property; determining a power consumption value of the plurality of devices; determining whether the property is experiencing a power deficit based on the solar power generation value being less than the power consumption value; accessing energy utilization priority indicators of the plurality of devices; identifying one or more first devices of the plurality of devices that have a lower energy utilization priority than one or more second devices of the plurality of devices based on the energy utilization priority indicators; and reducing power consumption of the one or more first devices based on the property experiencing the power deficit.

These and other implementations can include one or more of the following features. In some implementations, the energy utilization priority indicators are first energy utilization priority indicators associated with a first scene. Some implementations include detecting whether a second scene is triggered; retrieving a scene configuration record for the second scene, the scene configuration record including second energy utilization priority indicators; determining a power status based on a power output of a solar power generator and a power consumption of the plurality of devices; and operating the plurality of devices in accordance with the second energy utilization priority indicators and the power status. In some implementations, the second scene is configured to cause one or more selected devices of the plurality of devices to switch from a low energy utilization mode to a high energy utilization mode. Operating the plurality of devices can include operating the one or more selected devices in the high energy utilization mode based on the power status indicating a power deficit state.

Implementations can include determining whether the property is experiencing a power surplus based on the solar power generator generating more power than a current power consumption of the plurality of devices, and enabling additional power consumption among the one or more first devices, the one or more second devices, or both based on the property experiencing the power surplus. In some implementations, the one or more first devices include a lighting device. Reducing power consumption can include sending a command to the lighting device to cause the lighting device to dim light output by a predetermined amount. Implementations can include determining a battery charging status associated with a battery, the battery being coupled with the solar power generator. Determining whether the property is experiencing the power deficit can include using the battery charging status.

Particular configurations of the technology described in this disclosure can be implemented so as to realize one or more of the following potential advantages. Power consumption can be dynamically increased or decreased based on a detection of a solar power surplus or a solar power deficit respectively. Such dynamic scaling can enable occupants to enjoy more features of their devices when there is a surplus, yet scale back when there is a deficit in order to avoid having to draw power from a costly power grid. Device prioritizations can influence whether a device's power consumption is reduced or maintained during a power deficit. Scene configurations can specify different device prioritizations. Detection of a scene change can change the device prioritizations.

The details of one or more implementations are set forth in the accompanying drawings and the description below. Other features will be apparent from the description and drawings.

DETAILED DESCRIPTION

Figure 1:
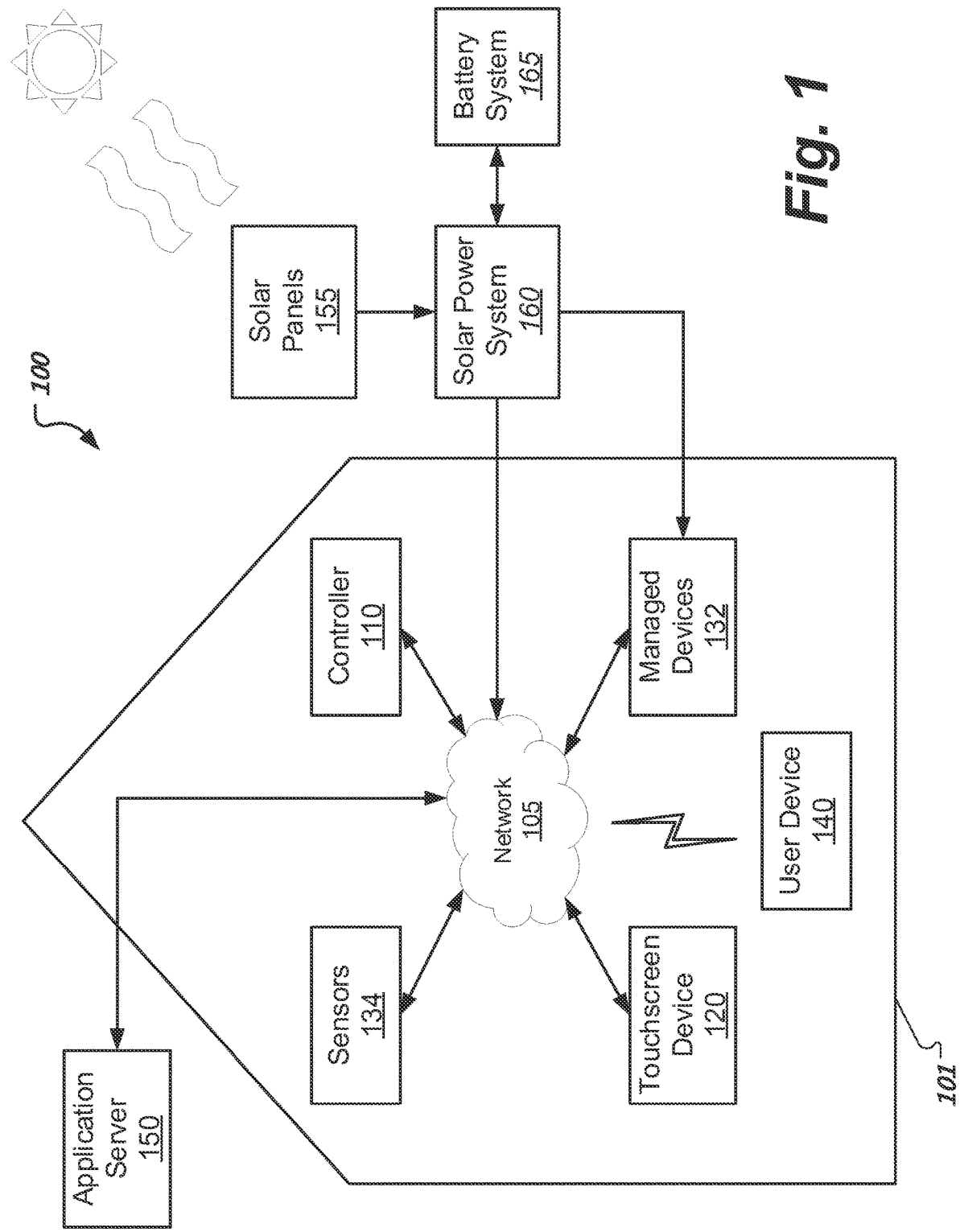
FIG. 1 shows an example of a system that provides energy management of various devices based on solar power generation, power usage, and one or more user settings.

A solar energy system can be deployed to reduce reliance on a conventional power grid in order reduce cost, increase usage of clean energy, or both. Local solar energy generation and storage can add some complexities to optimizing usage of devices such as heating ventilation and air conditioning (HVAC) systems, major appliances, and other powered devices within a home or office. Cost-conscious or environmentally-conscious individuals may wish to deploy a controller that automatically adjusts energy usage based on the current or predicted amount of solar power generation.

An energy management system can make energy decisions based on information such as current solar power generation from a local panel array, current battery reserve levels, current energy usage, projected solar power generation based on time-of-day, sun position and weather patterns, projected energy usage based on historical patterns, and current grid energy prices. The energy management system can combine this information with user-defined preferences or observed user behavior to adjust one or more variables to decrease energy usage when solar power generation, power reserves, or both are low. Alternatively, the system can adjust the variables to increase energy usage when solar power generation, power reserves, or both are high. For example, a user may prefer to set the HVAC to keep the home temperature at 72° during the summer, but the user may be willing to have it as high as 78° to save energy. The system can determine a particular set-point within this temperature range to set the HVAC's thermostat based on the variables detailed above. For example, the system can detect a solar power generation surplus and may accordingly cause the HVAC system to activate the HVAC to cool the house to 72°. However, when there is a solar power deficit, the energy management system can prevent the HVAC from cooling until the temperature reaches 78°.

The energy management system can be integrated with a home automation and security system. For example, the energy management system can be configured to determine, through various security and non-security sensors, the location of individuals in the house and shut off enrolled lights when a room was not in use. The aggressiveness of this energy usage curtailment could be scaled based on the aforementioned factors. For example, the propensity for the energy management system to turn off or dim a light in room where sensors detect a lack of occupancy may be higher during a solar power generation deficit, e.g., lights will turn off after 5 minutes no occupancy rather than 30 minutes.

In some implementations, the energy management system can provide a user interface such that a user can mark one or more devices such as appliances or switches as non-critical and allow the system to shutdown these devices to conserve energy. For example, a user may enjoy having devices such as digital picture frames, monitors or televisions displaying photos, dashboards, stock tickers operate as normal, but the user may classify these devices though the user interface as a low energy utilization priority. The energy management system can be authorized to disable these devices in the situation where solar power generation and reserves drops or will be expected to drop below power usage. In some implementations, the energy management system can dim to a degree one or more lights that are classified as low energy utilization priority which saves energy but is not particularly noticeable to an occupant.

An energy management application can provide one or more scene buttons which give a user the ability to adjust multiple devices in a home or office. Various examples of scenes include Home, Away, Sleep, and Wake Up. Each scene can be configured to adjust several things at once. For example, tapping the Away button can arm the security system, look doors, close garage doors, and modify the thermostat settings to save energy. Further, a scene can be configured to switch a particular device from a low to a high energy utilization priority, or from high to low priority. For example, the application can allow the user to create new solar power based scenes and define actions to take with each scene. While a user may want to conserve power most of the time, a full-power "Entertaining" scene can be created to meet a user's demand such as providing full-power for entertaining guests such as engaging the HVAC system, turning on lights, and turning on water features. Thus, the "Entertaining" scene can adjust energy usage restrictions to be much less aggressive while guests are present on the property. In another example, a television being used as a photo frame during the day can be switched from a low to a high energy utilization priority when a user selects a "Watching TV" scene, whereas a Sleep or "Goodnight" scene can switch the television back to the low energy utilization priority.

FIG. 1 shows an example of a system 100 that provides energy management of various managed devices 132 based on solar power generation, power usage, and one or more user settings. The system 100 can include a controller 110, a touchscreen device 120, managed devices 132, sensors 134, a user device 140, and an application server 150 connected over a network 105. The various components of the system 100 can be located in and associated with a property 101 such as a home or an office. In some implementations, a user can control the system 100 via the touchscreen device 120, a user device 140, or both. In some implementations, the user device 140, such as a smartphone, can be used to control the system 100 from a remote location.

The system 100 includes a solar power system 160 that provides power to the property 101 including, among other things, the managed devices 132. The solar power system 160 and/or one or more solar panels 155 can be referred to as a solar power generator. During a solar power generation surplus, the solar power system 160 can transfer energy from the solar panels 155 to the battery system 165. However, the solar power system 160 can draw energy from the battery system 165 to provide energy when the solar panels 155 are not producing enough energy. The solar power system 160 can include sensors to measure solar power generation and one or more battery charge levels. The solar power system 160 can include circuitry to couple with main power lines such that solar power system 160 switches over to the main power lines when there is a solar or battery energy deficit.

The network 105 can be configured to provide communications among connected devices. For example, the network 105 can be configured to enable exchange of electronic communications between the controller 110, the touchscreen device 120, the managed devices 132, the sensors 134, the user device 140, and the application server 150. The network 105 can include, for example, one or more wireline segments, one or more wireless segments, or both. In some implementations, the network 105 includes a wireless access point and a broadband Internet device.

The controller 110 can be configured to control various aspects of the system 100 including security, automation, energy management, or a combination thereof. In some implementations, the controller 110 includes circuitry such as a network module and a processor configured to execute instructions of a program that controls operation of the system 100. The controller 110 can be configured to receive input from sensors 134, the solar power system 160, touchscreen device 120, and user device 140. The controller 110 can use the received input to control the managed devices 132 via network 105.

The sensors 134 can include one or more of a contact sensor, a motion sensor, a glass break sensor, an occupancy sensor, or any other type of sensor that can be included in an alarm or security system. The sensors 134 can also include an environmental sensor, such as a temperature sensor, a water sensor, a rain sensor, a wind sensor, a light sensor, a smoke detector, a carbon monoxide detector, an air quality sensor, etc. In some implementations, the sensors 134 can include one or more cameras. The cameras can be video/photographic cameras or other type of optical sensing devices configured to capture images. For instance, the cameras can be configured to capture images of an area within a building monitored by the controller 110. The cameras can be configured to capture single, static images of the area and also video images of the area in which multiple images of the area are captured at a relatively high frequency (e.g., thirty images per second). The cameras can be controlled based on commands received from the touchscreen device 120 or user device 140. In some implementations, the controller 110 can use a camera based sensor to detect people in a room.

Various examples of managed devices 132 include connected televisions, kitchen appliances, controllable light sources, safety and security devices, water features, and HVAC systems. Other types of managed devices are possible. For example, a managed device 132 can include a smart control unit that controls an ordinary light source such as a lamp. In some implementations, one or more of the managed devices 132 can periodically transmit information such as usage or status information to the controller 110. In some implementations, one or more of the managed devices 132 can be controlled via the touchscreen device 120, the user device 140, or both. In some implementations, the controller 110 can control the managed devices 132 based on information received from the touchscreen device 120, user device 140, and the sensors 134. In some implementations, the controller 110 can control the managed devices 132 based on scene configuration records, a predetermined scheduled, or both. In some implementations, the touchscreen device 120 can enable or disable one or more of the managed devices 132 via the controller 110 based on received sensor data from the sensors 134. In some implementations, a scene can be automatically triggered based on one or more energy management criteria such as a rule based on a change in solar power generation, stored power availability, or both; and the controller 110 can control the managed devices 132 based on the triggered scene.

The user device 140, such as a smartphone or a laptop, can receive data associated with the system 100 through the network 105. The user device 140 can receive the data from the controller 110 through the network 105. In some implementations, the application server 150 can relay data received from the controller 110 to the user device 140 through the network 105 or a different network. In this regard, the application server 150 can facilitate communications between the user device 140 and the controller 110.

The user device 140 can include a system access application. For example, the user device 140 can load or install the system access application based on data received over a network 105 or data received from local media. In some implementations, the system access application of the user device 140 identifies a geographic location associated with the user device 140 and communicates information identifying the geographic location to the application server 150. The controller 110 can detect whether a user is presently located inside or outside the property 101.

The application server 150 can be a remote monitoring station for a service provider such as an internet service provider, an alarm security provider, or an internet security provider that receives data transmissions such as, for example, internet activity, Wi-Fi presence, internet connectivity, and monitoring system information. The application server 150 can track connection events to the network 105 transmitted from devices located within the property 101. For example, the application server 150 can be configured to exchange communications with a local installation client connected to the network 105 that generates the activity reports and transmits the activity reports to the application server 150.

The application server 150 can be configured to transmit cloud-based configuration settings to the controller 110 to adjust the operations of the controller 110. For example, a user can create scenes via a website hosted by the application server 150. The scenes can be used to control the managed devices 132 based on whether the solar power system 160 is reporting a power surplus or deficit. In some implementations, a user can select a scene via a touchscreen device 120 or a user device 140. In some implementations, the application server 150 can provide information such as weather patterns such that the controller 110 can predict solar power generation.

Figure 2:
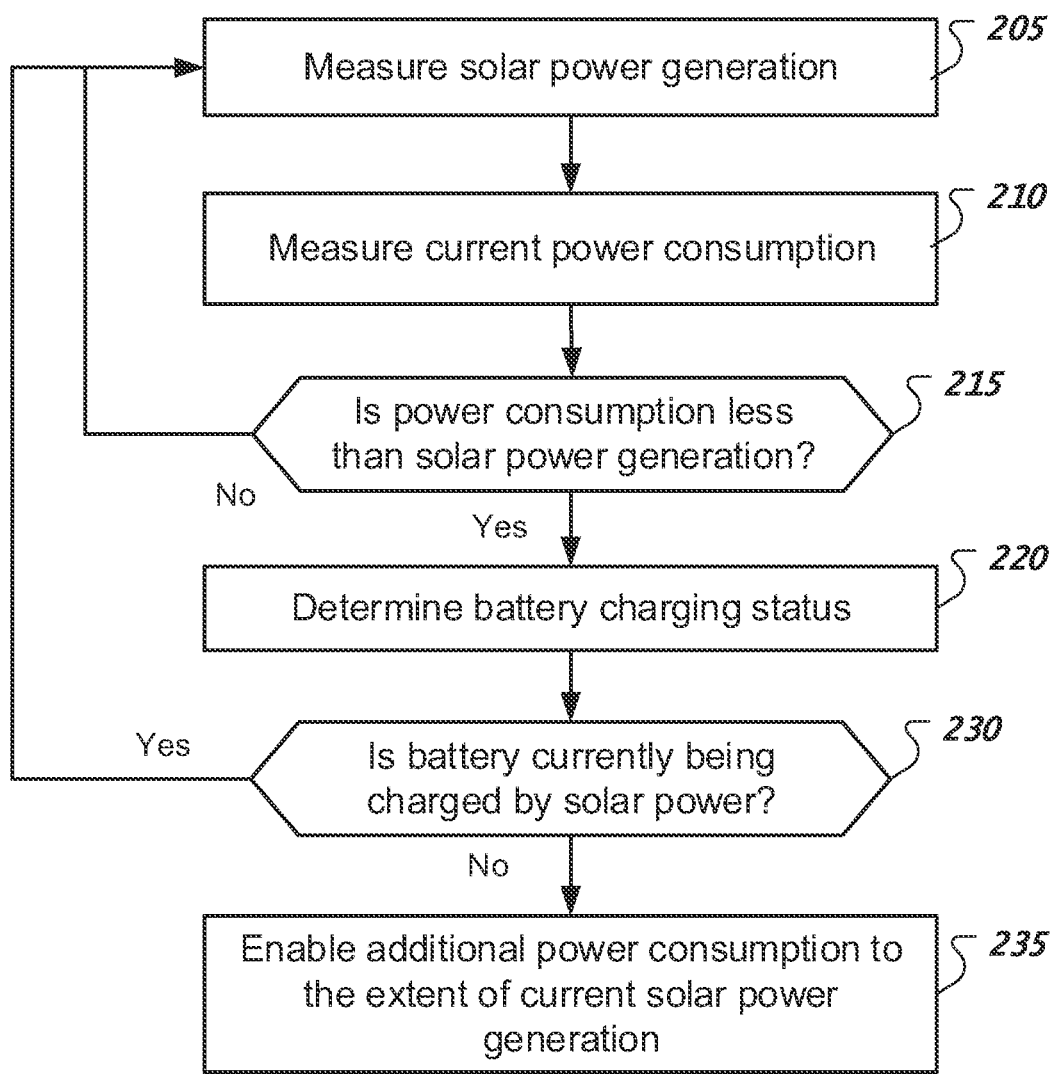
FIG. 2 shows a flowchart of an example of a process performed by a controller that performs actions based on solar power surplus detection.

FIG. 2 shows a flowchart of an example of a process 201 performed by a controller that performs actions based on a solar power surplus detection. The controller, such as controller 110 of FIG. 1, can be coupled to various power sensors to determine whether there is a solar power generation surplus or deficit. In this example, one or more managed device may be in an energy saving state based on a previous solar power generation deficit or a user preference to conserve energy. At 205, the controller measures solar power generation. In some implementations, a solar power system includes a sensor that measures solar power generation and sends the measurement to the controller. At 210, the controller measures current power consumption. In some implementations, the controller communicates with a centralized smart power meter to measure current power consumption. In some implementations, the controller communicates with power consumption meters attached to appliances, e.g., the managed devices 132. At 215, the controller determines whether the power consumption is less than the solar power generation. If the power consumption is not less than the solar power generation, e.g., there is a solar power deficit, the controller continues at 205 after a predetermined amount of time. Further, the controller can take action to reduce power in the event of a deficit, see, for example, the process associated with FIG. 3.

If the power consumption is less than the solar power generation, the controller determines a battery charging status at 220. In some implementations, a solar power system includes one or more batteries to store excess solar power and one or more battery sensors coupled with the one or more batteries. The battery sensors can be configured to determine whether the one or more batteries are charging or discharging. The controller can receive a charge status message from the solar power system that is based on the one or more battery sensors. At 230, the controller determines whether a battery is currently being charged by the solar power. If the battery is being charged, the controller continues at 205 after a predetermined amount of time. If the battery is sufficiently charged, then the controller enables additional power consumption to the extent of current solar power generation at 235. For example, a HVAC system may have been set to a higher trigger temperature to conserve power. Given the solar power surplus, the controller can lower the trigger temperature to cause the HVAC to start cooling the house.

Figure 3:
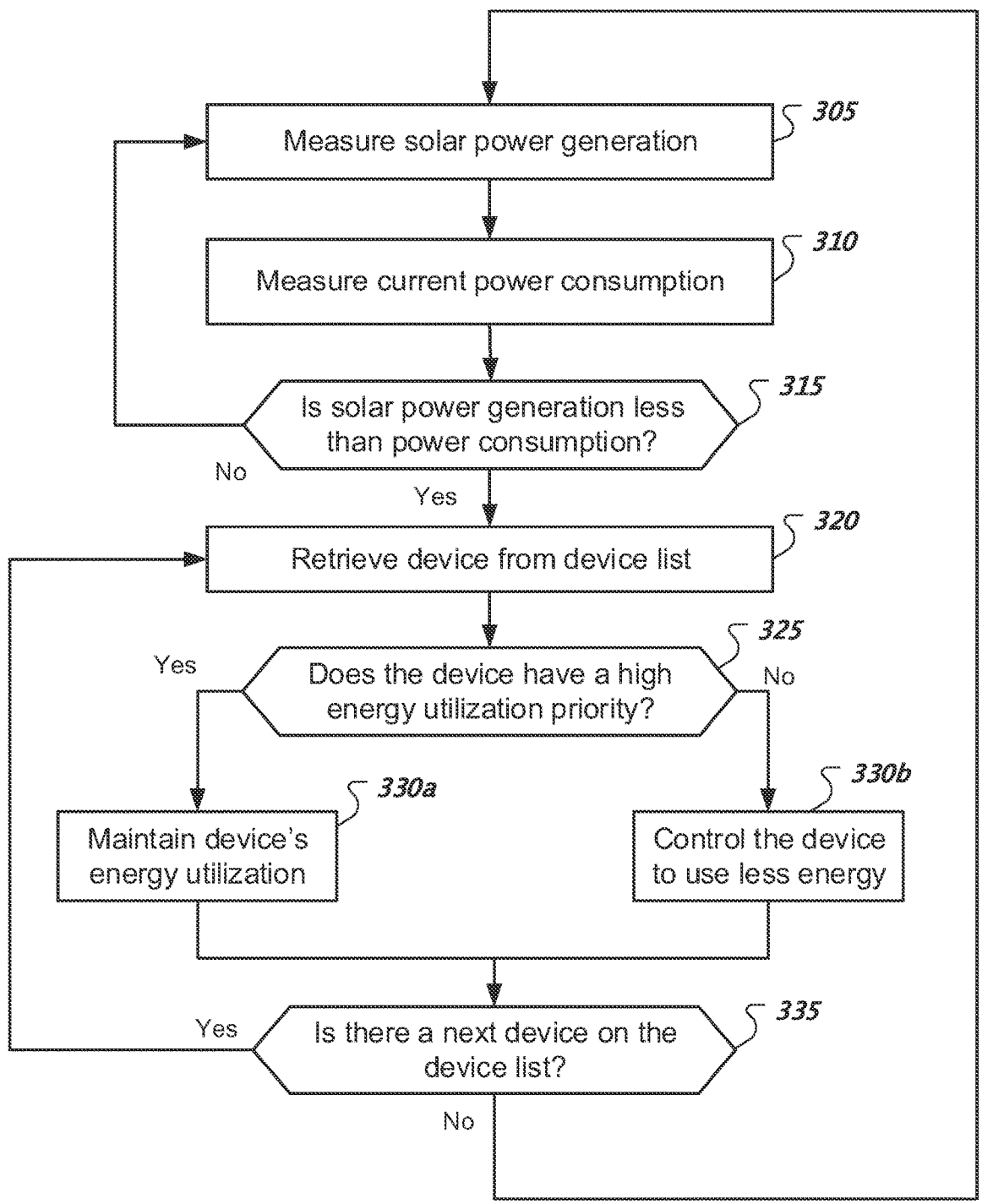
FIG. 3 shows a flowchart of an example of a process performed by a controller that performs actions based on solar power deficit detection.

FIG. 3 shows a flowchart of an example of a process 301 performed by a controller that performs actions based on a solar power deficit detection. The controller, such as controller 110 of FIG. 1, can be coupled to various power sensors to determine whether there is a solar power generation surplus or deficit. At 305, the controller measures solar power generation. At 310, the controller measures current power consumption. In some implementations, the controller is configured to periodically poll sensors to obtain solar power generation values and power consumption values. At 315, the controller determines whether solar power generation is less than power consumption. If solar power generation is not less than power consumption, e.g., there is a solar power surplus, the controller continues at 305 after a predetermined amount of time.

If solar power generation is less than power consumption, the controller at 315 has detected a solar power deficit. At 320, the controller retrieves a device from a device list. In some implementations, the device list is arranged based on device identifiers. In some implementations, the device list is arranged based on energy utilization priority. In some implementations, the controller can retrieve a group of devices from the device list based on a priority level. In some implementations, the controller accesses a database of devices that its manages. For example, the device list can include identifiers for devices such as a HVAC system, television, lights, water features such as fountains or pools, washer, dryer, dishwasher, and medical equipment. Each of the devices on the device list can be associated with an energy utilization priority indicator, which may be defined by an owner of the devices. An energy utilization priority indicator can indicate a power consumption state of a device. Medical equipment, for example, may have a high energy utilization priority indicator that will permit the equipment to be on at all times, whereas the HVAC may have a low energy utilization priority indicator that causes the HVAC to conserve energy when there is a power deficit.

At 325, the controller determines whether the device has a high energy utilization priority. If the device has such a priority, then the controller maintains the device's energy utilization at 330a. Note that a device with a high energy utilization priority may be in an off-state, e.g., unplugged or switched off by a user, nonetheless, the controller can maintain the device's energy utilization in the sense that the device will still be permitted to be turned-on and use energy that it normally uses when turned-on.

If the device does not have a high energy utilization priority, then the controller controls the device to use less energy at 330b. In some implementations, a device includes a power management interface that receives commands from the controller. For example, a device can enter a sleep mode or standby mode based on a command from the controller. In some implementations, a device such as a lamp is plugged into a power management interface that enables the lamp to be controlled, e.g., turned-on, turned-off, or dimmed, by the controller.

At 335, the controller determines whether there is a next device on the device list, and if there is continues at 320. Otherwise, if there are no more devices to process on the device list, the controller continues at 305. In some implementations, the process 301 is repeated at periodic intervals. In some implementations, the process 301 is repeated based on receiving new power usage or generation status messages from sensors.

In some implementations, the controller can use statistical techniques such as averaging to smooth out fluctuations in the measured power generation and consumption values. In some implementations, the controller can use prediction techniques to determine whether there will be a power deficit. For example, the controller can predict a drop in solar power generation based on time-of-day, increasing cloud coverage, or other factors. In some implementations, the controller can use prediction techniques to determine whether there will be an increase in power consumption. For example, the controller can detect a garage door opening and predict that power consumption will increase since the property's occupant arrived home.

Figure 4:
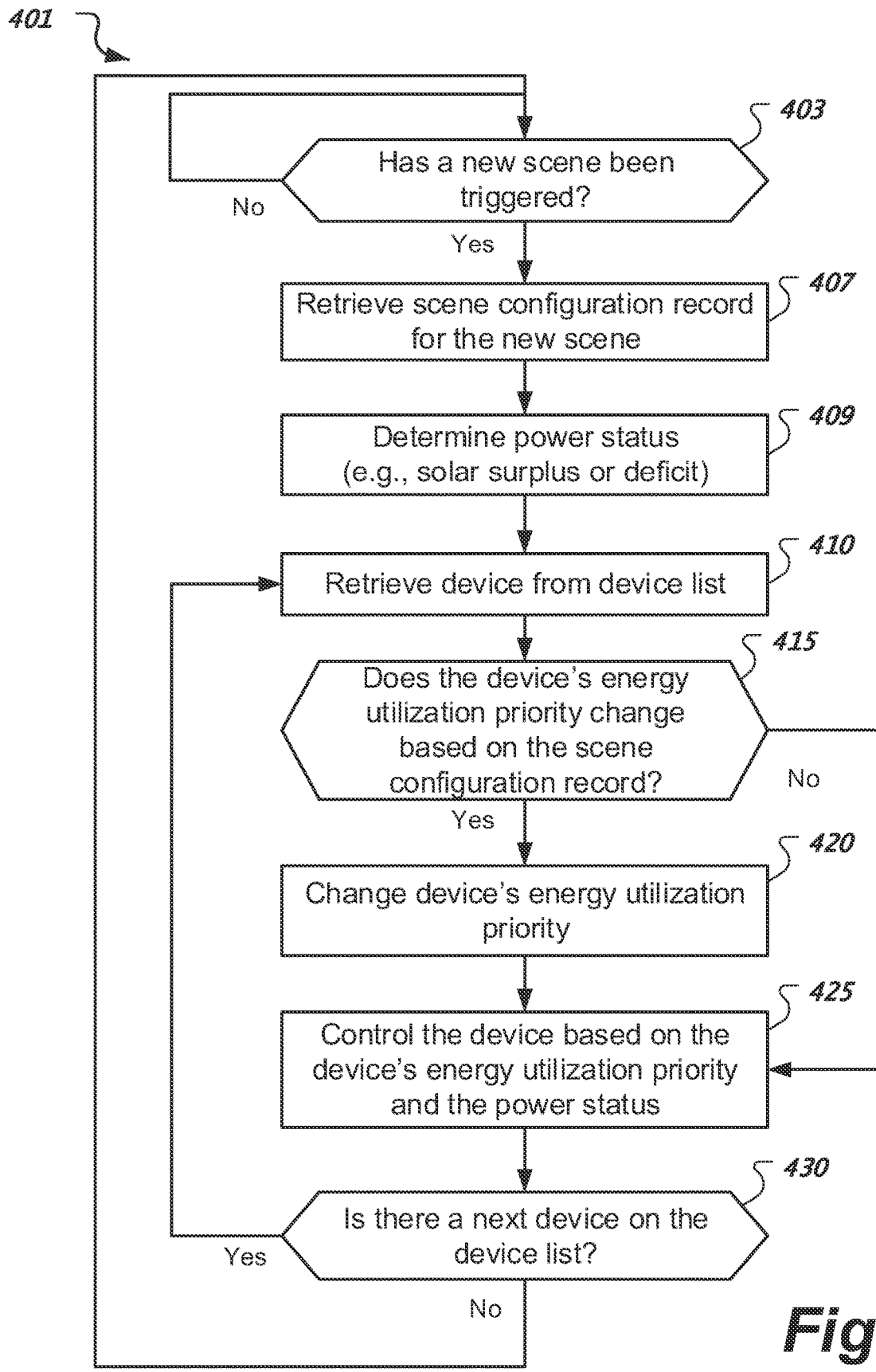
FIG. 4 shows a flowchart of an example of a process performed by a controller that is based on scene change detection.

FIG. 4 shows a flowchart of an example of a process 401 performed by a controller that is based on a scene change detection. At 403, the controller determines whether a new scene has been triggered. If this is not the case, the controller repeats at 403 until a new scene has been triggered. In some implementations, a new scene can be triggered based on a user selection of a scene via a control interface, time of day trigger, or a sensor input. In some implementations, a user selects a scene via a touchscreen device or an application on the user's smartphone. The controller, such as controller 110 of FIG. 1, can receive a scene selection input from the touchscreen or the application and carryout power control based on the new scene. In some implementations, a new scene can be triggered based on a scene rule. For example, a scene rule can trigger a new scene based on an entry event such as a front door open event or a garage door open event. In some implementations, a scene rule can trigger a new scene based on predetermined time of day. In some implementations, a scene rule can trigger a new scene based on the alarm system being armed or disarmed. In some implementations, a scene rule can trigger a new scene based on a detection of a person within a room.

At 407, the controller retrieves a scene configuration record for the new scene. In some implementations, the controller accesses a scene configuration record from a database. A scene configuration record can specify actions to take when that scene is selected or triggered. In some implementations, a scene configuration record can include a list of one or more device identifiers that are required to have a high energy utilization priority under the scene, and a list of one or more device identifiers that are required to have a low energy utilization priority under the scene. In some implementations, a device can be assigned to a priority within a wide range of energy utilization priorities, e.g., three, four, five or more. The controller, at 409, determines a power status (e.g., solar surplus or deficit). In some implementations, the controller can measure or predict the amount of solar power generation and the amount of power consumption to determine whether there is a solar power surplus or deficit.

At 410, the controller retrieves a device from a device list. Retrieving a device can include accessing a device identifier. At 415, the controller determines whether the device's energy utilization priority change based on the scene configuration record. In some implementations, the controller accesses the scene configuration record based on a device identifier to determine whether the device is assigned to the high energy utilization priority or the low energy utilization priority under the new scene. If a change is required, then at 420, the controller changes the device's energy utilization priority. Otherwise, the controller maintains the device's energy utilization priority if no change is required based on the new scene. At 425, the controller controls the device based on the device's energy utilization priority and the power status. In some implementations, the controller sends a control message to the device to adjust its energy consumption. In some implementations, a control message can instruct a managed device such as a lamp to turn off or dim. In some implementations, a control message can instruct a managed device to turn off one or more nonessential features.

At 430, the controller determines whether there is a next device on the device list. If there is a next device, the controller continues at 410. Otherwise, if there are no more devices to process on the device list, the controller continues at 403. In some implementations, the controller retrieves the new priorities from the scene configuration record and updates a local data structure with the new priorities, and after the updates, proceeds to selectively adjust energy consumption for managed devices based on the new priorities.

Figure 5:
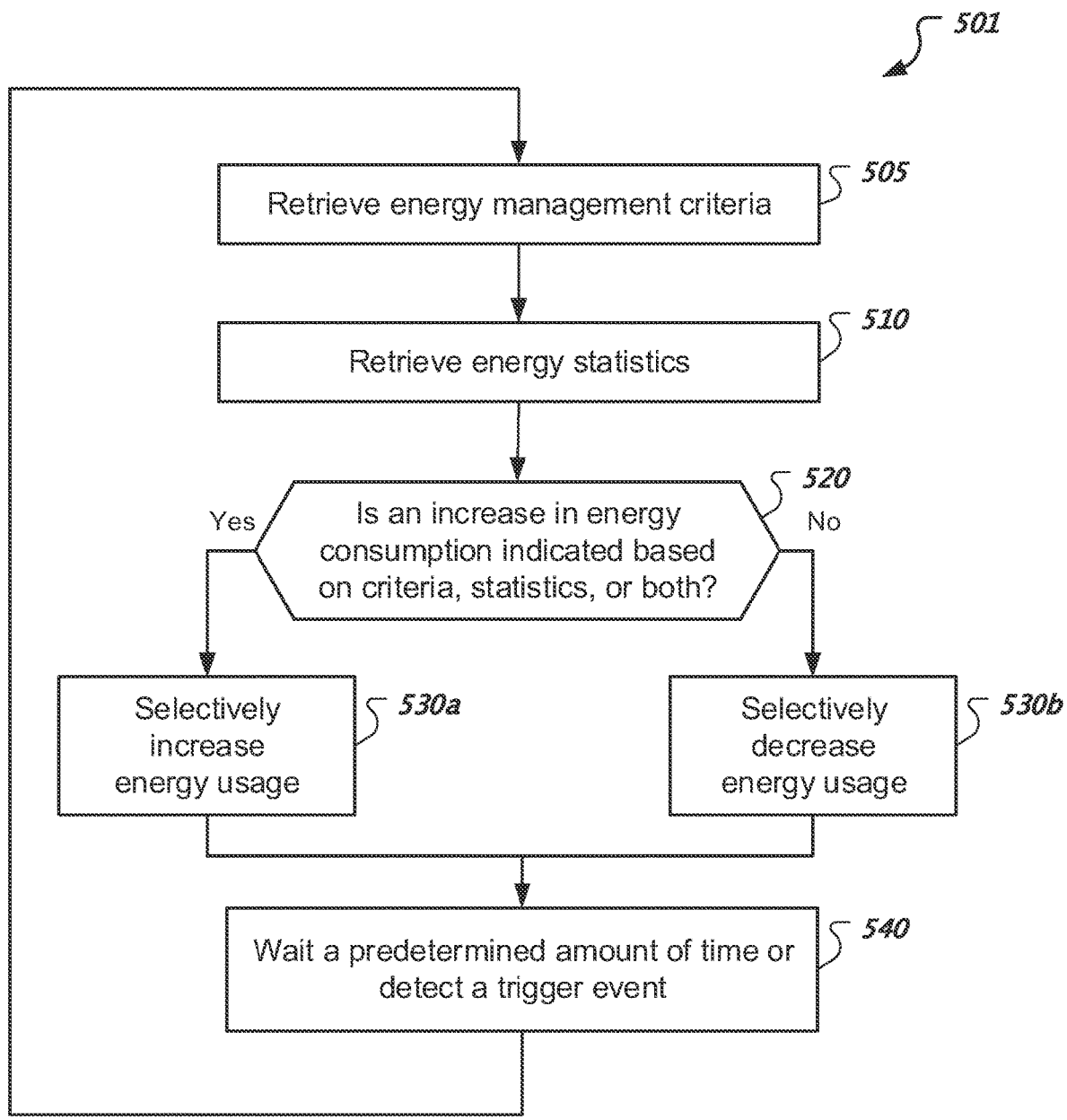
FIG. 5 shows a flowchart of an example of a process performed by a controller that determines whether to increase or decrease energy usage.

FIG. 5 shows a flowchart of an example of a process 501 performed by a controller that determines whether to increase or decrease energy usage. At 505, the controller retrieves energy management criteria. In some implementations, energy management criteria can include parameters that are based on a solar energy generation surplus or deficit. In some implementations, retrieving energy management criteria can include accessing a user preference record about energy cost management, e.g., a user preference to keep a total power bill or total energy usage under a predetermined amount per billing cycle. In some implementations, retrieving energy management criteria can include accessing a user preference about a monthly clean energy target, e.g., a user expressed goal of obtaining a predetermined percentage of the user's energy usage from clean energy such as solar power. At 510, the controller retrieves energy statistics. In some implementations, retrieving energy statistics includes accessing current energy usage, current solar power generation, accumulated energy cost, anticipated energy costs, or a combination thereof.

At 520, the controller determines whether an increase in energy consumption is indicated based on criteria, statistics, or both. If an increase is indicated, then the controller, at 530*a*, selectively increases energy usage. For example, if anticipated energy costs for a current billing cycle fall below a budgeted amount, then the controller can enable additional energy consumption. In some implementations, the controller enables additional energy consumption based on a device's energy utilization priority. If an increase is not indicated, then the controller, at 530*b*, selectively decreases energy usage. For example, if anticipated energy costs for a current billing cycle is projected to exceed a budgeted amount, then the controller can reduce energy consumption. In some implementations, the controller reduces energy consumption starting with devices having a low energy utilization priority. At 540, the controller waits a predetermined amount of time or detects a trigger event, after which the controller can repeat the process 501.

Figure 6:
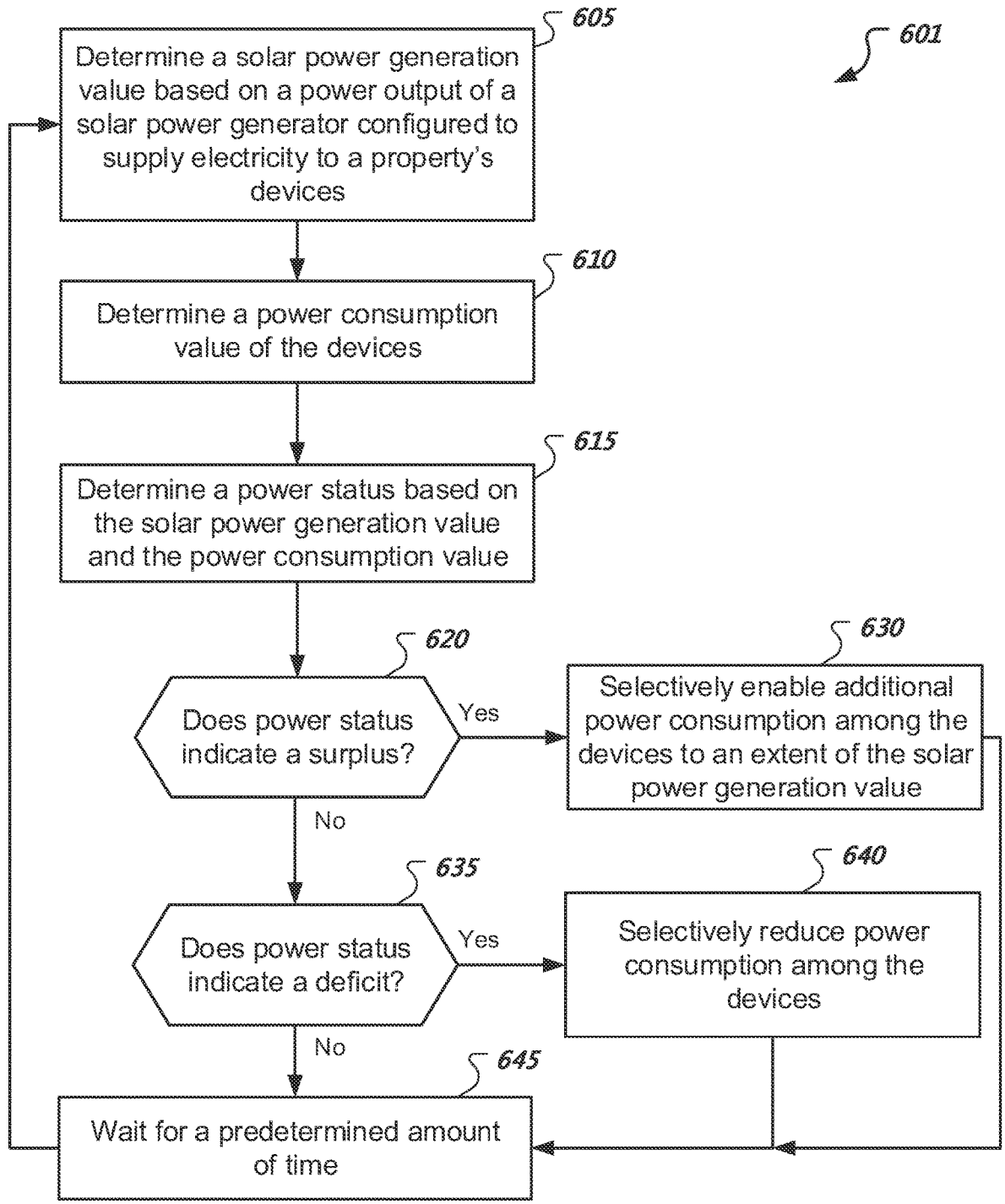
FIG. 6 shows a flowchart of another example of a process performed by a controller that determines whether to increase or decrease energy usage.

FIG. 6 shows a flowchart of another example of a process 601 performed by a controller that determines whether to increase or decrease energy usage. At 605, the controller determines a solar power generation value based on a power output of a solar power generator configured to supply electricity to a property's devices. In some implementations, a solar power generation value is based on a predicted solar power output. For example, the controller obtain a weather forecast to determine that solar power output will decrease due to a developing overcast condition that will block the sunlight. In some implementations, the controller communicates with a power measurement device coupled with a solar power generator to determine a current solar power generation value. In some implementations, a solar power generation value can be expressed in units of Watts. However, other units for power are possible.

At 610, the controller determines a power consumption value of the devices. In some implementations, the controller communicates with one or more power consumption meters to determine a power consumption value. In some implementations, the controller accesses a power consumption database to determine an estimated power consumption of a particular device that the controller knows is in a powered on state. In some implementations, a power consumption value can be expressed in units of Watts. However, other units for power are possible. In some implementations, a power consumption value is based on predicted power consumption. For example, the controller can predict that energy usage will increase when the homeowners wake-up.

At 615, the controller determines a power status based on the solar power generation value and the power consumption value. A power status can indicate one of various states such as a surplus state (e.g., the solar power generation value is greater than the power consumption value), a deficit state (e.g., the power consumption value is greater than the solar power generation value), or a balanced state (e.g., average power consumption value is approximately equal to an average solar power generation value). In some implementations, the power status is a predicted power status that is based on a predicted power consumption value and a predicted solar power generation value. In some implementations, the power status is based on a user preference record regarding energy management criteria. For example, the controller can access a user preference record about energy cost management, e.g., a user preference to keep a total power bill or total energy usage under a predetermined amount per billing cycle. For example, a user preference can cause the controller to induce a power deficit state to prevent a monthly power bill from exceeding a predetermined amount. In some implementations, the user preference can induce a power surplus state as long as a total power bill for the month is predicted to be under a predetermined amount. In some implementations, the controller can access a user preference about a monthly clean energy target, e.g., a user expressed goal of obtaining a predetermined percentage of the user's energy usage from clean energy such as solar power.

At 620, the controller determines whether the power status indicates a surplus state. If a surplus state is indicated, the controller, at 630, can selectively enable additional power consumption among the devices to an extent of the solar power generation value. In some implementations, the controller can send a command to switch a device from a low energy utilization mode to a high energy utilization mode. In some implementations, the controller can send a command to a lighting device to cause the lighting device to increase light output by a predetermined amount. In some implementations, the controller can send a command to active the property's cooling system. After enabling additional power consumption, the controller can wait for a predetermined amount of time at 645 before repeating the process 601 to make another determination of the power status. In some implementations, a trigger event, such as a scene change event, can cause the controller to repeat the process 601.

If a surplus state is not indicated, the controller, at 635, determines whether the power status indicates a deficit state. If a deficit state is indicated, the controller, at 640, can selectively reduce power consumption among the devices. For example, the controller can power off one or more devices while keeping other devices powered. In some implementations, the controller can send a command to a lighting device to cause the lighting device to dim light output by a predetermined amount. After reducing power consumption, the controller can wait for a predetermined amount of time at 645 before repeating the process 601 to make another determination of the power status.

The controller, in some implementations, can make power reduction determinations based on energy utilization priority indicators of the property's devices. The controller can identify one or more low priority devices of the property's devices that have a low energy utilization priority. The controller can identify one or more high priority devices of the property's devices that have a high energy utilization priority. The controller can reduce power consumption of the one or more low priority devices based on the property experiencing the power deficit. The controller can maintain power consumption of the one or more high priority devices based on the property experiencing the power deficit.

In some implementations, a solar power generator is coupled with a battery. The controller can determine a battery charging status associated with the battery. The controller can be configured to delay an enabling of the additional power consumption at 630 based on the battery charging status indicating that the battery is charging.

Figure 7:
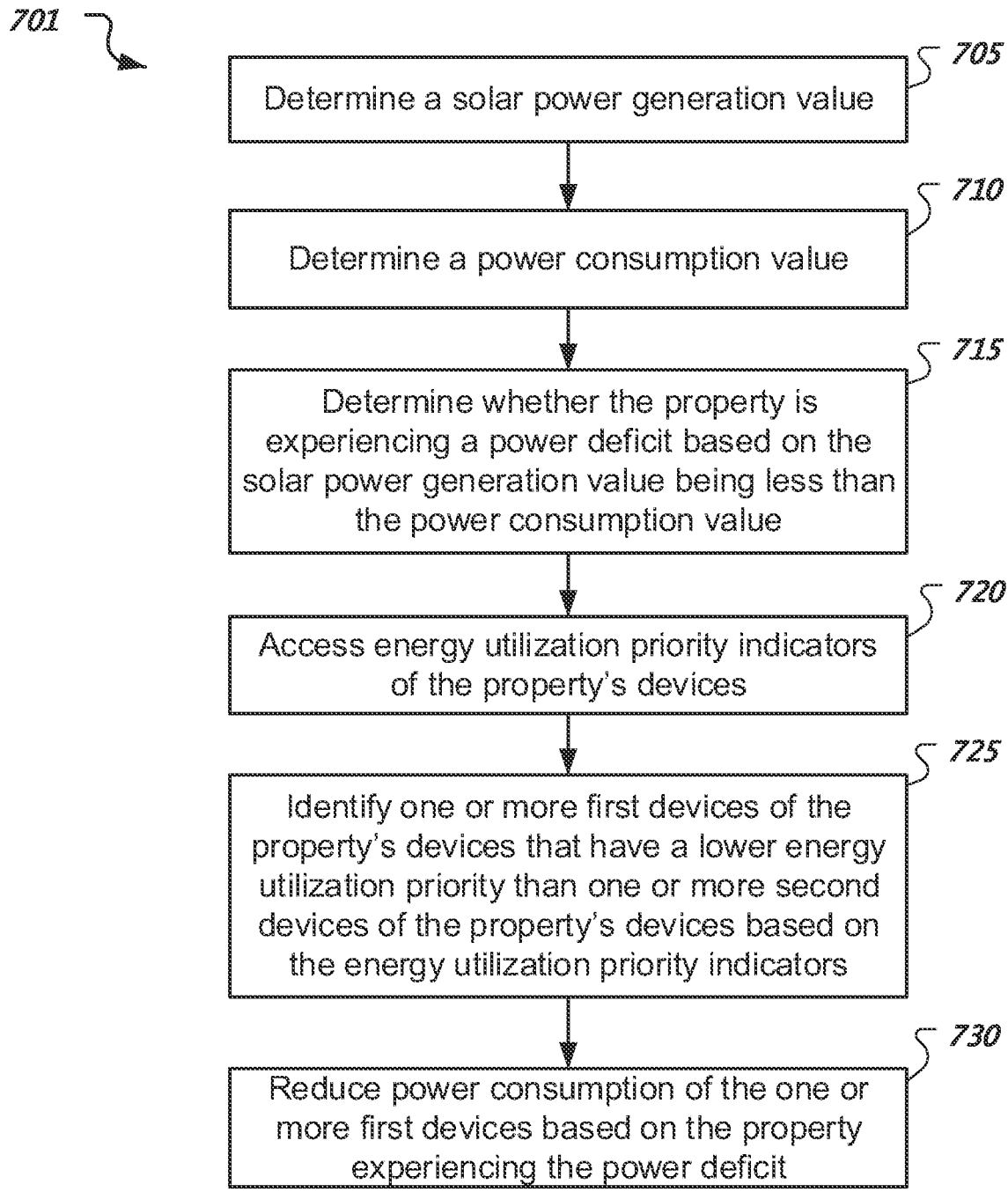
FIG. 7 shows a flowchart of an example of a process performed by a controller that determines how to reduce power consumption during a power deficit.

FIG. 7 shows a flowchart of an example of a process 701 performed by a controller that determines how to reduce power consumption during a power deficit. At 705, the controller determines a solar power generation value of a solar power generator configured to supply electricity to a devices associated with a property. At 710, the controller determines a power consumption value of the property's devices. At 715, the controller determines whether the property is experiencing a power deficit based on the solar power generation value being less than the power consumption value. At 720, the controller accesses energy utilization priority indicators of the property's devices. In some implementations, an energy utilization priority indicator can specify a state such as high or low. Other types of state are possible. At 725, the controller identifies one or more first devices of the property's devices that have a lower energy utilization priority than one or more second devices of the property's devices based on the energy utilization priority indicators. At 730, the controller reduces the power consumption of the one or more first devices based on the property experiencing the power deficit. In some implementations, the controller can maintain the power consumption of the one or more second devices.

Figure 8:
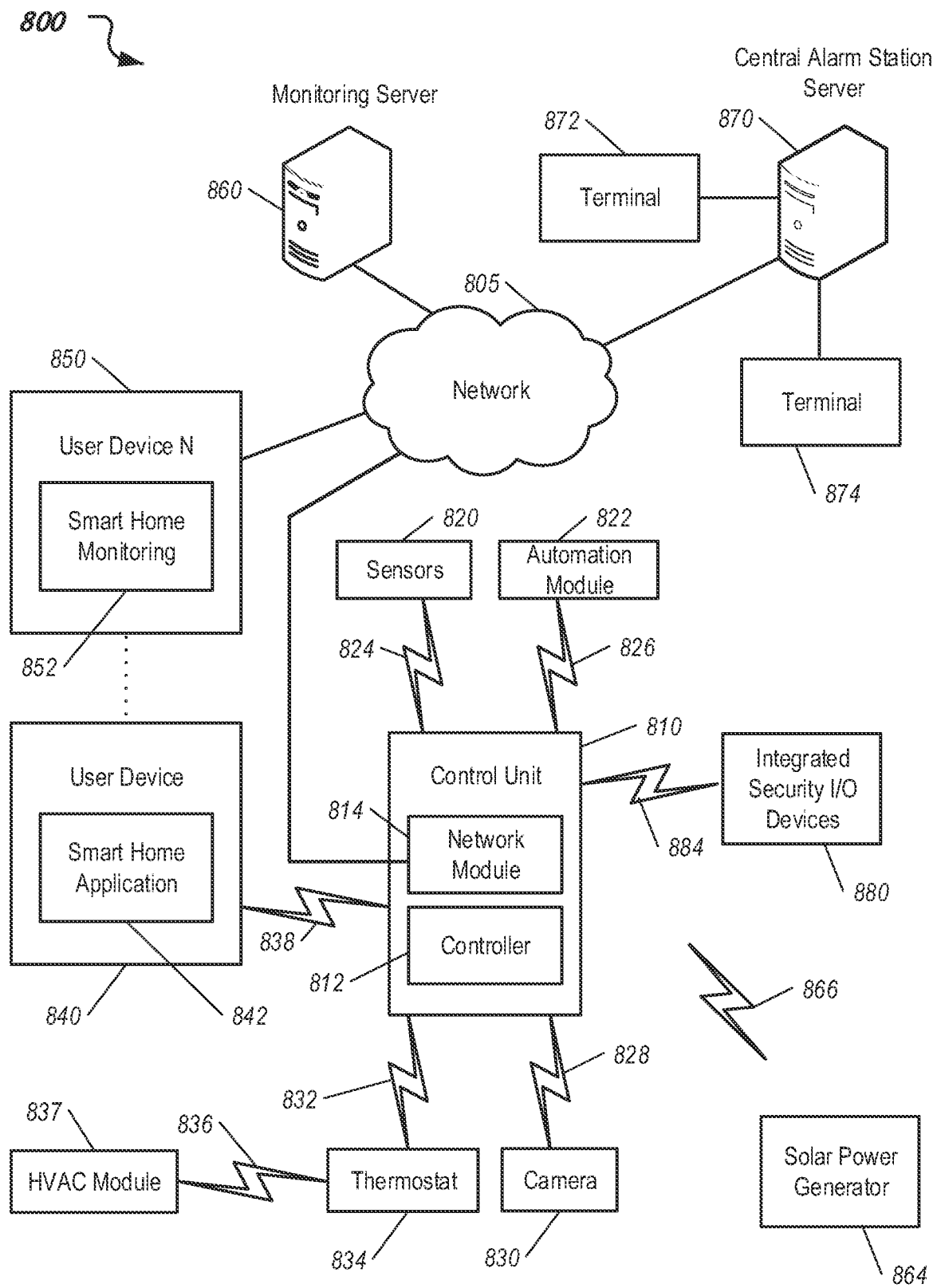
FIG. 8 shows a block diagram of an example of a monitoring system that includes a solar power generator.

FIG. 8 shows a block diagram of an example of a monitoring system 800 that includes a solar power generator 864. The monitoring system 800 includes a network 805, a control unit 810, one or more user devices 840 and 850, a monitoring server 860, and a central alarm station server 870. In some examples, the network 805 facilitates communications between the control unit 810, the one or more user devices 840 and 850, the monitoring server 860, and the central alarm station server 870.

The network 805 is configured to enable exchange of electronic communications between devices connected to the network 805. For example, the network 805 may be configured to enable exchange of electronic communications between the control unit 810, the one or more user devices 840 and 850, the monitoring server 860, and the central alarm station server 870. The network 805 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 805 may include multiple networks or subnetworks, each of which may include, for example, a wired or wireless data pathway. The network 805 may include a circuit-switched network, a packet-switched data network, or any other network able to carry electronic communications (e.g., data or voice communications). For example, the network 805 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 805 may include one or more networks that include wireless data channels and wireless voice channels. The network 805 may be a wireless network, a broadband network, or a combination of networks including a wireless network and a broadband network.

The control unit 810 includes a controller 812 and a network module 814. The controller 812 is configured to control a control unit monitoring system (e.g., a control unit system) that includes the control unit 810. In some examples, the controller 812 may include a processor or other control circuitry configured to execute instructions of a program that controls operation of a control unit system. In these examples, the controller 812 may be configured to receive input from sensors, flow meters, or other devices included in the control unit system and control operations of devices included in the household (e.g., speakers, lights, doors, etc.). For example, the controller 812 may be configured to control operation of the network module 814 included in the control unit 810.

The network module 814 is a communication device configured to exchange communications over the network 805. The network module 814 may be a wireless communication module configured to exchange wireless communications over the network 805. For example, the network module 814 may be a wireless communication device configured to exchange communications over a wireless data channel and a wireless voice channel. In this example, the network module 814 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 814 also may be a wired communication module configured to exchange communications over the network 805 using a wired connection. For instance, the network module 814 may be a modem, a network interface card, or another type of network interface device. The network module 814 may be an Ethernet network card configured to enable the control unit 810 to communicate over a local area network and/or the Internet. The network module 814 also may be a voice band modem configured to enable the alarm panel to communicate over the telephone lines of Plain Old Telephone Systems (POTS).

The control unit system that includes the control unit 810 includes one or more sensors. For example, the monitoring system may include multiple sensors 820. The sensors 820 may include a lock sensor, a contact sensor, a motion sensor, or any other type of sensor included in a control unit system. The sensors 820 also may include an environmental sensor, such as a temperature sensor, a water sensor, a rain sensor, a wind sensor, a light sensor, a smoke detector, a carbon monoxide detector, an air quality sensor, etc. The sensors 820 further may include a power consumption meter. In some implementations, a sensor 820 can be coupled with one or more devices such as HVAC components 827 to measure their power consumption.

In some implementations, the control unit 810 communicates with an automation module 822 and the camera 830 to perform monitoring. The automation module 822 is connected to one or more devices that enable home automation control. For instance, the automation module 822 may be connected to one or more lighting systems and may be configured to control operation of the one or more lighting systems. Also, the automation module 822 may be connected to one or more electronic locks at the property and may be configured to control operation of the one or more electronic locks (e.g., control Z-Wave locks using wireless communications in the Z-Wave protocol. Further, the automation module 822 may be connected to one or more appliances at the property and may be configured to control operation of the one or more appliances. The automation module 822 may include multiple modules that are each specific to the type of device being controlled in an automated manner. The automation module 822 may control the one or more devices based on commands received from the control unit 810. For instance, the automation module 822 may cause a lighting system to illuminate an area to provide a better image of the area when captured by a camera 830.

The camera 830 may be a video/photographic camera or other type of optical sensing device configured to capture images. For instance, the camera 830 may be configured to capture images of an area within a building or within a residential facility 102-A monitored by the control unit 810. The camera 830 may be configured to capture single, static images of the area and also video images of the area in which multiple images of the area are captured at a relatively high frequency (e.g., thirty images per second). The camera 830 may be controlled based on commands received from the control unit 810.

The camera 830 may be triggered by several different types of techniques. For instance, a Passive Infra-Red (PIR) motion sensor may be built into the camera 830 and used to trigger the camera 830 to capture one or more images when motion is detected. The camera 830 also may include a microwave motion sensor built into the camera and used to trigger the camera 830 to capture one or more images when motion is detected. The camera 830 may have a "normally open" or "normally closed" digital input that can trigger capture of one or more images when external sensors (e.g., the sensors 820, PIR, door/window, etc.) detect motion or other events. In some implementations, the camera 830 receives a command to capture an image when external devices detect motion or another potential alarm event. The camera 830 may receive the command from the controller 812 or directly from one of the sensors 820.

In some examples, the camera 830 triggers integrated or external illuminators (e.g., Infra-Red, Z-wave controlled "white" lights, lights controlled by the automation module 822, etc.) to improve image quality when the scene is dark. An integrated or separate light sensor may be used to determine if illumination is desired and may result in increased image quality.

The camera 830 may be programmed with any combination of time/day schedules, system "arming state", or other variables to determine whether images should be captured or not when triggers occur. The camera 830 may enter a low-power mode when not capturing images. In this case, the camera 830 may wake periodically to check for inbound messages from the controller 812. The camera 830 may be powered by internal, replaceable batteries if located remotely from the control unit 810. The camera 830 may employ a small solar cell to recharge the battery when light is available. Alternatively, the camera 830 may be powered by the controller's 812 power supply if the camera 830 is co-located with the controller 812.

The system 800 also includes thermostat 834 to perform dynamic environmental control at the property. The thermostat 834 is configured to monitor temperature and/or energy consumption of an HVAC system associated with the thermostat 834, and is further configured to provide control of environmental (e.g., temperature) settings. In some implementations, the thermostat 834 can additionally or alternatively receive data relating to activity at a property and/or environmental data at a property, e.g., at various locations indoors and outdoors at the property. The thermostat 834 can directly measure energy consumption of the HVAC system associated with the thermostat, or can estimate energy consumption of the HVAC system associated with the thermostat 834, for example, based on detected usage of one or more components of the HVAC system associated with the thermostat 834. The thermostat 834 can communicate temperature and/or energy monitoring information to or from the control unit 810 and can control the environmental (e.g., temperature) settings based on commands received from the control unit 810.

In some implementations, the thermostat 834 is a dynamically programmable thermostat and can be integrated with the control unit 810. For example, the dynamically programmable thermostat 834 can include the control unit 810, e.g., as an internal component to the dynamically programmable thermostat 834. In addition, the control unit 810 can be a gateway device that communicates with the dynamically programmable thermostat 834.

A HVAC module 837 can coupled with one or more HVAC components, such as a furnace or a A/C, associated with a property. The HVAC module 837 can be configured to control operation of the one or more components of the HVAC system. In some implementations, the HVAC module 837 is also configured to monitor energy consumption of the HVAC system components, for example, by directly measuring the energy consumption of the HVAC system components or by estimating the energy usage of the one or more HVAC system components based on detecting usage of components of the HVAC system. The HVAC module 837 can communicate energy monitoring information and the state of the HVAC system components to the thermostat 834 via link 836 and can control the one or more components of the HVAC system based on commands received from the thermostat 834 via link 836.

The system 800 further includes one or more integrated security devices 880. The one or more integrated security devices may include any type of device used to provide alerts based on received sensor data. For instance, the one or more control units 810 may provide one or more alerts to the one or more integrated security input/output devices. Additionally, the one or more control units 810 may receive one or more sensor data from the sensors 820 and determine whether to provide an alert to the one or more integrated security devices 880.

The sensors 820, the automation module 822, the camera 830, the thermostat 834, and the integrated security devices 880 communicate with the controller 812 over communication links 824, 826, 828, 832, 884, and 886. The communication links 824, 826, 828, 832, 884, and 886 may be a wired or wireless data pathway configured to transmit signals from the sensors 820, the automation module 822, the camera 830, the thermostat 834, and the integrated security devices 880 to the controller 812. The sensors 820, the automation module 822, the camera 830, the thermostat 834, and the integrated security devices 880 may continuously transmit sensed values to the controller 812, periodically transmit sensed values to the controller 812, or transmit sensed values to the controller 812 in response to a change in a sensed value.

The communication links 824, 826, 828, 832, 884, and 886 may include a local network. The sensors 820, the automation module 822, the camera 830, the thermostat 834, and the integrated security devices 880, and the controller 812 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 8 (CAT5) or Category 8 (CAT6) wired Ethernet network. The local network may be a mesh network constructed based on the devices connected to the mesh network.

The monitoring server 860 is an electronic device configured to provide monitoring services by exchanging electronic communications with the control unit 810, the one or more user devices 840 and 850, and the central alarm station server 870 over the network 805. For example, the monitoring server 860 may be configured to monitor events (e.g., alarm events) generated by the control unit 810. In this example, the monitoring server 860 may exchange electronic communications with the network module 814 included in the control unit 810 to receive information regarding events (e.g., alerts) detected by the central alarm station server 870. The monitoring server 860 also may receive information regarding events (e.g., alerts) from the one or more user devices 840 and 850.

In some examples, the monitoring server 860 may route alert data received from the network module 814 or the one or more user devices 840 and 850 to the central alarm station server 870. For example, the monitoring server 860 may transmit the alert data to the central alarm station server 870 over the network 805.

The monitoring server 860 may store sensor and image data received from the monitoring system and perform analysis of sensor and image data received from the monitoring system. Based on the analysis, the monitoring server 860 may communicate with and control aspects of the control unit 810 or the one or more user devices 840 and 850.

The central alarm station server 870 is an electronic device configured to provide alarm monitoring service by exchanging communications with the control unit 810, the one or more user devices 840 and 850, and the monitoring server 860 over the network 805. For example, the central alarm station server 870 may be configured to monitor alerting events generated by the control unit 810. In this example, the central alarm station server 870 may exchange communications with the network module 814 included in the control unit 810 to receive information regarding alerting events detected by the control unit 810. The central alarm station server 870 also may receive information regarding alerting events from the one or more user devices 840 and 850 and/or the monitoring server 860.

The central alarm station server 870 is connected to multiple terminals 872 and 874. The terminals 872 and 874 may be used by operators to process alerting events. For example, the central alarm station server 870 may route alerting data to the terminals 872 and 874 to enable an operator to process the alerting data. The terminals 872 and 874 may include general-purpose computers (e.g., desktop personal computers, workstations, or laptop computers) that are configured to receive alerting data from a server in the central alarm station server 870 and render a display of information based on the alerting data. For instance, the controller 812 may control the network module 814 to transmit, to the central alarm station server 870, alerting data indicating that a sensor 820 detected motion from a motion sensor via the sensors 820. The central alarm station server 870 may receive the alerting data and route the alerting data to the terminal 872 for processing by an operator associated with the terminal 872. The terminal 872 may render a display to the operator that includes information associated with the alerting event (e.g., the lock sensor data, the motion sensor data, the contact sensor data, etc.) and the operator may handle the alerting event based on the displayed information.

In some implementations, the terminals 872 and 874 may be mobile devices or devices designed for a specific function. Although FIG. 8 illustrates two terminals for brevity, actual implementations may include more (and, perhaps, many more) terminals. The one or more user devices 840 and 850 are devices that host and display user interfaces. For instance, the user device 840 is a mobile device that hosts one or more native applications (e.g., the smart home application 842). The user device 840 may be a cellular phone or a non-cellular locally networked device with a display. The user device 840 may include a cell phone, a smart phone, a tablet PC, a personal digital assistant ("PDA"), or any other portable device configured to communicate over a network and display information. The user device 840 may perform functions unrelated to the monitoring system, such as placing personal telephone calls, playing music, playing video, displaying pictures, browsing the Internet, maintaining an electronic calendar, etc.

The user device 840 includes a smart home application 842. The smart home application 842 refers to a software/firmware program running on the corresponding mobile device that enables the user interface and features described throughout. The user device 840 may load or install the smart home application 842 based on data received over a network or data received from local media. The smart home application 842 runs on mobile devices platforms, such as iPhone, iPod touch, Blackberry, Google Android, Windows Mobile, etc. The smart home application 842 enables the user device 840 to receive and process image and sensor data from the monitoring system 800.

The user device 850 may be a general-purpose computer (e.g., a desktop personal computer, a workstation, or a laptop computer) that is configured to communicate with the monitoring server 860 and/or the control unit 810 over the network 805. The user device 850 may be configured to display a smart home user interface 852 that is generated by the user device 850 or generated by the monitoring server 860. For example, the user device 850 may be configured to display a user interface (e.g., a web page) provided by the monitoring server 860 that enables a user to perceive images captured by the camera 830 and/or reports related to the monitoring system. Although FIG. 8 illustrates two user devices for brevity, actual implementations may include more (and, perhaps, many more) or fewer user devices.

In some implementations, the one or more user devices 840 and 850 communicate with and receive monitoring system data from the control unit 810 using the communication link 838. For instance, the one or more user devices 840 and 850 may communicate with the control unit 810 using various local wireless protocols such as Wi-Fi, Bluetooth, Zwave, ZigBee, HomePlug (Ethernet over powerline), or wired protocols such as Ethernet and USB, to connect the one or more user devices 840 and 850 to local security and automation equipment. The one or more user devices 840 and 850 may connect locally to the monitoring system and its sensors and other devices. The local connection may improve the speed of status and control communications because communicating through the network 805 with a remote server (e.g., the monitoring server 860) may be significantly slower.

Although the one or more user devices 840 and 850 are shown as communicating with the control unit 810, the one or more user devices 840 and 850 may communicate directly with the sensors 820 and other devices controlled by the control unit 810. In some implementations, the one or more user devices 840 and 850 replace the control unit 810 and perform the functions of the control unit 810 for local monitoring and long range/offsite communication.

In other implementations, the one or more user devices 840 and 850 receive monitoring system data captured by the control unit 810 through the network 805. The one or more user devices 840, 850 may receive the data from the control unit 810 through the network 805 or the monitoring server 860 may relay data received from the control unit 810 to the one or more user devices 840 and 850 through the network 805. In this regard, the monitoring server 860 may facilitate communication between the one or more user devices 840 and 850 and the monitoring system.

In some implementations, the one or more user devices 840 and 850 may be configured to switch whether the one or more user devices 840 and 850 communicate with the control unit 810 directly (e.g., through link 838) or through the monitoring server 860 (e.g., through network 805) based on a location of the one or more user devices 840 and 850. For instance, when the one or more user devices 840 and 850 are located close to the control unit 810 and in range to communicate directly with the control unit 810, the one or more user devices 840 and 850 use direct communication. When the one or more user devices 840 and 850 are located far from the control unit 810 and not in range to communicate directly with the control unit 810, the one or more user devices 840 and 850 use communication through the monitoring server 860.

In some implementations, the one or more user devices 840 and 850 are used in conjunction with only local sensors and/or local devices in a house. In these implementations, the system 800 only includes the one or more user devices 840 and 850, the sensors 820, the automation module 822, and the camera 830. The one or more user devices 840 and 850 receive data directly from the sensors 820, the automation module 822, and the camera 830, and send data directly to the sensors 820, the automation module 822, and the camera 830. The one or more user devices 840, 850 provide the appropriate interfaces/processing to provide visual surveillance and reporting. In some implementations, the system 800 provides end users with access to images captured by the camera 830 to aid in decision making. The system 800 may transmit the images captured by the camera 830 over a wireless WAN network to the user devices 840 and 850.

In some implementations, a state of the monitoring system 800 and other events sensed by the monitoring system may be used to enable/disable video/image recording devices (e.g., the camera 830). In these implementations, the camera 830 may be set to capture images on a periodic basis when the alarm system is armed in an "Away" state, but set not to capture images when the alarm system is armed in a "Stay" state or disarmed. In addition, the camera 830 may be triggered to begin capturing images when the alarm system detects an event, such as an alarm event, a door-opening event for a door that leads to an area within a field of view of the camera 830, or motion in the area within the field of view of the camera 830. In other implementations, the camera 830 may capture images continuously, but the captured images may be stored or transmitted over a network when needed.

The controller 812 can communicate with a solar power generator 864 via a communication link 866. In some implementations, the controller 812 can collect solar power generation measurements from the solar power generator 864 via the communication link 866. In some implementations, the controller 812 can collect power consumption measurements from one or more sensors 820 via the communication link 824. In some implementations, the smart home application 842 can be configured to display power generation and consumption measurements. In some implementations, the smart home application 842 can be configured to display a power status, e.g., surplus or deficit.

In some implementations, the controller 812 can communicate with the thermostat 834 to modify a temperature set-point of the HVAC module 837 to either increase power consumption or decrease power consumption of the HVAC components. In some implementations, the controller 812 can communicate with the automation module 822 to power on or power off devices such as lighting to increase or decrease power consumption. In some implementations, the controller 812 can collect data from sources such as sensors 820 and/or camera 830 to determine whether a room is occupied, and control the automation module 822 to power off one or more devices in the room when the room is not occupied.

In some implementations, critical aspects of the monitoring system 800 can be assigned a critical energy utilization priority indicator such that the integrity of the monitoring system 800 is maintained through a power deficit to provide continued safety of the residents and security of the property. For example, devices such as a control unit 810, one or more sensors 820, or camera 830 can be assigned a critical energy utilization priority indicator such that they remain fully operational all of the time. Moreover, life-support medical devices can also be assigned a critical energy utilization priority indicator such that the devices remain powered on at all times.

In some implementations, energy utilization priorities of the devices may change based on an armed state of the monitoring system 800. If the monitoring system 800 is armed away, then one or more devices such as lighting devices or the HVAC components can be re-assigned to have a low energy utilization priority indicator. However, a lighting device that provides lighting for security reasons can maintain or can be re-assigned to have a high energy utilization priority indicator.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system comprising:
   circuitry to determine a solar power generation value based on a power output of a solar power generator configured to supply electricity to a plurality of devices associated with a property;
   circuitry to determine a battery charging status associated with a battery, the battery being coupled with the solar power generator;
   circuitry to determine a predicted power consumption value of the plurality of devices; and
   a controller configured to:
      detect that a scene is triggered, wherein the scene specifies one or more actions to take when one or more triggers occur;
      in response to detecting that the scene is triggered, determine a predicted power status based on the solar power generation value and the predicted power consumption value based on actions to take when the scene is triggered, wherein the predicted power status indicates a power surplus state when the solar power generation value satisfies the predicted power consumption value and a power deficit state when the predicted power consumption value does not satisfy the solar power generation value,
      in response to determining that the predicted power status indicates the power surplus state and the battery charging status indicates that the battery is not charging, selectively enable additional power consumption among the plurality of devices to an extent of the solar power generation value,
      in response to determining that the battery charging status indicates that the battery is charging, delay an enabling of the additional power consumption that will increase an existing power consumption among the plurality of devices, and
      in response to determining that the predicted power status indicates the power deficit state, selectively reduce power consumption among the plurality of devices.

2. The system of claim 1, wherein the scene is a second scene, and the controller is configured to:
   operate the plurality of devices in accordance with first energy utilization priority indicators associated with a first scene, the first energy utilization priority indicators indicating respective power consumption states of the plurality of devices,
   in response to detecting that the second scene is triggered, retrieve a scene configuration record for the second scene, the scene configuration record comprising second energy utilization priority indicators, and
   operate the plurality of devices in accordance with the second energy utilization priority indicators and the predicted power status.

3. The system of claim 2, wherein the second scene is configured to cause one or more selected devices of the plurality of devices to switch from a low energy utilization mode to a high energy utilization mode, and wherein the controller is configured to operate the one or more selected devices in the high energy utilization mode based on the predicted power status indicating the power deficit state.

4. The system of claim 2, wherein the second scene is triggered by (i) a user selection of the second scene via a control interface, (ii) time of day trigger, or (iii) a sensor input.

5. The system of claim 1, wherein the controller is configured to:
   access energy utilization priority indicators of the plurality of devices,
   identify one or more first devices of the plurality of devices that have a first energy utilization priority based on the energy utilization priority indicators,
   identify one or more second devices of the plurality of devices that have a second energy utilization priority based on the energy utilization priority indicators, the second energy utilization priority being higher than the first energy utilization priority, reduce power consumption of the one or more first devices based on the predicted power status indicating the power deficit state, and maintain power consumption of the one or more second devices based on the predicted power status indicating the power deficit state.

6. The system of claim 1, wherein the scene is a second scene, and the controller is configured to operate the plurality of devices in accordance with a first scene configuration record associated with a first scene, wherein the controller is configured to operate the plurality of devices in accordance with a second scene configuration record associated with the second scene, the second scene configuration record specifying actions to take when the second scene is triggered by an entry event, wherein the solar power generation value is based on a predicted solar power output, the predicted power status being based on the predicted solar power output, and wherein the predicted power consumption value is based on power consumption associated with the second scene.

7. The system of claim 1, wherein the predicted power status is based on a user preference record regarding energy management criteria.

8. The system of claim 2, wherein the second scene is triggered by an occupancy sensor.

9. The system of claim 3, wherein the low energy utilization mode causes a device to consume energy, and wherein the high energy utilization mode causes a device to consume energy.

10. A system comprising:
circuitry to determine a solar power generation value of a solar power generator configured to supply electricity to a plurality of devices associated with a property;
circuitry to determine a battery charging status associated with a battery, the battery being coupled with the solar power generator, the battery charging status being selected from a group comprising a status indicating that the battery is charging, and a status indicating that the battery is not charging;
circuitry to predict a power consumption value of the plurality of devices based on actions to take in response to detecting that a scene is triggered; and
a controller configured to:
predict whether the property is likely to experience a power deficit based on the solar power generation value being less than the predicted power consumption value,
access energy utilization priority indicators of the plurality of devices,
identify one or more first devices of the plurality of devices that have a lower energy utilization priority than one or more second devices of the plurality of devices based on the energy utilization priority indicators, and
reduce power consumption of the one or more first devices based on the property experiencing the power deficit, and wherein the controller is configured to use the battery charging status to determine whether the property is experiencing the power deficit.

11. The system of claim 10, wherein the scene is a second scene, and the energy utilization priority indicators are first energy utilization priority indicators associated with a first scene, and wherein the controller is configured to:
in response to detecting that the second scene is triggered, retrieve a scene configuration record for the second scene, the scene configuration record comprising second energy utilization priority indicators,
determine a predicted power status based on a power output of the solar power generator and the predicted power consumption of the plurality of devices, and
operate the plurality of devices in accordance with the second energy utilization priority indicators and the predicted power status.

12. The system of claim 11, wherein the second scene is configured to cause one or more selected devices of the plurality of devices to switch from a low energy utilization mode to a high energy utilization mode, and wherein the controller is configured to operate the one or more selected devices in the high energy utilization mode based on the predicted power status indicating a power deficit state.

13. The system of claim 10, wherein the controller is configured to determine whether the property is experiencing a power surplus based on the solar power generator generating more power than a current power consumption of the plurality of devices, and wherein the controller is configured to enable additional power consumption among the one or more first devices, the one or more second devices, or both based on the property experiencing the power surplus.

14. The system of claim 10, wherein the one or more first devices comprise a lighting device, wherein the controller is configured to send a command to the lighting device to cause the lighting device to dim light output by a predetermined amount.

15. A method comprising:
determining a solar power generation value of a solar power generator configured to supply electricity to a plurality of devices associated with a property;
predicting a power consumption value of the plurality of devices based on actions to take in response to detecting that a scene is triggered;
determining a battery charging status associated with a battery, the battery being coupled with the solar power generator, the battery charging status being selected from a group comprising a status indicating that the battery is charging, and a status indicating that the battery is not charging;
predicting whether the property is likely to experience a power deficit based on the solar power generation value being less than the predicted power consumption value, wherein determining whether the property is experiencing the power deficit comprises using the battery charging status;
accessing energy utilization priority indicators of the plurality of devices;
identifying one or more first devices of the plurality of devices that have a lower energy utilization priority than one or more second devices of the plurality of devices based on the energy utilization priority indicators; and
reducing power consumption of the one or more first devices based on the property experiencing the power deficit.

16. The method of claim 15, wherein the scene is a second scene, and the energy utilization priority indicators are first energy utilization priority indicators associated with a first scene, the method further comprising:
in response to detecting that the second scene is triggered, retrieving a scene configuration record for the second scene, the scene configuration record comprising second energy utilization priority indicators;

determining a predicted power status based on a power output of a solar power generator and the predicted power consumption of the plurality of devices; and operating the plurality of devices in accordance with the second energy utilization priority indicators and the predicted power status.

17. The method of claim 16, wherein the second scene is configured to cause one or more selected devices of the plurality of devices to switch from a low energy utilization mode to a high energy utilization mode, and wherein operating the plurality of devices comprises operating the one or more selected devices in the high energy utilization mode based on the predicted power status indicating a power deficit state.

18. The method of claim 15, comprising:
determining whether the property is experiencing a power surplus based on the solar power generator generating more power than a current power consumption of the plurality of devices; and
enabling additional power consumption among the one or more first devices, the one or more second devices, or both based on the property experiencing the power surplus.

19. The method of claim 15, wherein the one or more first devices comprise a lighting device, and wherein reducing power consumption comprises sending a command to the lighting device to cause the lighting device to dim light output by a predetermined amount.

20. The method of claim 15, wherein determining the battery charging status comprises using a battery sensor to determine whether the battery is charging.

21. The method of claim 15, wherein the one or more first devices comprise a lighting device in a room, wherein reducing power consumption of the one or more first devices based on the property experiencing the power deficit comprises increasing a propensity to turn off or dim the lighting device when a lack of occupancy has been detected in the room.

22. A system comprising:
circuitry to determine a solar power generation value based on a power output of a solar power generator configured to supply electricity to a plurality of devices associated with a property;
circuitry to determine a battery charging status associated with a battery, the battery being coupled with the solar power generator;
circuitry to determine a power consumption value of the plurality of devices; and
a controller configured to:
operate the plurality of devices in accordance with first energy utilization priority indicators associated with a first scene, the first energy utilization priority indicators indicating respective power consumption states of the plurality of devices,
determine a power status based on the solar power generation value and the power consumption value,
selectively enable additional power consumption among the plurality of devices to an extent of the solar power generation value based on the power status indicating a power surplus state,
delay an enabling of the additional power consumption based on the battery charging status indicating that the battery is charging,
selectively reduce power consumption among the plurality of devices based on the power status indicating a power deficit state, and
wherein the controller is configured to detect whether a second scene is triggered, the first scene and the second scene being different, retrieve a scene configuration record for the second scene, the scene configuration record specifying one or more actions to perform when the second scene is triggered, the scene configuration record comprising second energy utilization priority indicators, and operate the plurality of devices in accordance with the second energy utilization priority indicators in response to the second scene being triggered, wherein the power consumption value is a predicted power consumption value that is based on power consumption associated with the second scene, wherein the second scene is triggered by a sensor input or a user input, and wherein the power status is a predicted power status, the predicted power status being based on the predicted power consumption value.

23. The system of claim 22, wherein the second scene is configured to cause one or more selected devices of the plurality of devices to switch from a low energy utilization mode to a high energy utilization mode, wherein the low energy utilization mode causes a device to consume energy, wherein the high energy utilization mode causes a device to consume energy, and wherein the controller is configured to operate the one or more selected devices in the high energy utilization mode based on the power status indicating the power deficit state.

24. The system of claim 22, wherein the controller is configured to detect whether the second scene is triggered based on a change in a state of an alarm system.

25. The system of claim 22, wherein the second scene is triggered by a sensor input that indicates a change in occupancy.

26. The system of claim 22, wherein the solar power generation value is based on a predicted solar power output, and wherein the predicted power status is based on the predicted solar power output.

27. The method of claim 21, wherein increasing the propensity comprises decreasing a predetermined duration to turn off the lighting device after the lack of occupancy has been detected in the room.

* * * * *

UNITED STATES PATENT AND TRADEMARK OFFICE
CERTIFICATE OF CORRECTION

| | |
|---|---|
| PATENT NO. | : 11,532,939 B1 |
| APPLICATION NO. | : 15/865882 |
| DATED | : December 20, 2022 |
| INVENTOR(S) | : Aaron Lee Roberts and Bret Jutras |

It is certified that error appears in the above-identified patent and that said Letters Patent is hereby corrected as shown below:

In the Claims

In Claim 17, Column 25, Line 13 (approx.), before "power" delete "predicted".

Signed and Sealed this
Thirteenth Day of June, 2023

Katherine Kelly Vidal
*Director of the United States Patent and Trademark Office*